United States Patent [19]
Klein

[11] Patent Number: 5,581,793
[45] Date of Patent: Dec. 3, 1996

[54] SYSTEM FOR BYPASSING SETUP STATES IN A BUS OPERATION

[75] Inventor: Dean A. Klein, Lake City, Minn.

[73] Assignee: Micron Electronics, Inc., Nampa, Id.

[21] Appl. No.: 353,160

[22] Filed: Dec. 9, 1994

Related U.S. Application Data

[63] Continuation of Ser. No. 111,209, Aug. 24, 1993, abandoned.

[51] Int. Cl.$^6$ ...................................................... G06F 13/12
[52] U.S. Cl. ............................ 395/878; 395/823; 395/825
[58] Field of Search ..................................... 395/550, 823, 395/825, 878

[56] References Cited

U.S. PATENT DOCUMENTS

| | | | |
|---|---|---|---|
| 4,187,538 | 2/1980 | Douglas et al. | 395/425 |
| 4,215,400 | 7/1980 | Denko . | |
| 4,328,543 | 5/1982 | Brickman et al. | 395/325 |
| 4,365,293 | 12/1982 | Holtz . | |
| 4,379,327 | 4/1983 | Tietjen et al. . | |
| 4,390,984 | 6/1983 | Sugiura et al. | 370/16.1 |
| 4,454,575 | 6/1984 | Bushaw et al. | 395/275 |
| 4,486,883 | 12/1984 | Kanai et al. | 371/67.1 |
| 4,583,162 | 4/1986 | Prill | 395/421.03 |
| 4,586,175 | 4/1986 | Bedard et al. . | |
| 4,607,346 | 8/1986 | Hill . | |
| 4,615,017 | 9/1986 | Finlay et al. . | |
| 4,665,518 | 5/1987 | Champlin et al. . | |
| 4,667,191 | 5/1987 | Comroe et al. . | |
| 4,754,400 | 6/1988 | Wakahara et al. | 395/575 |
| 4,845,437 | 7/1989 | Mansur et al. | 328/15 |
| 4,891,768 | 1/1990 | Willems et al. . | |
| 4,912,633 | 3/1990 | Schweizer et al. . | |
| 4,972,432 | 11/1990 | Wilson et al. . | |
| 5,029,124 | 7/1991 | Leahy et al. . | |
| 5,109,500 | 4/1992 | Iseki et al. | 395/894 |
| 5,150,359 | 9/1992 | Wilson et al. . | |
| 5,199,106 | 3/1993 | Bourke et al. . | |
| 5,228,136 | 7/1993 | Shimizu et al. | 395/425 |
| 5,258,999 | 11/1993 | Wernimont et al. | 375/7 |
| 5,317,754 | 5/1994 | Blandy et al. | 395/800 |
| 5,448,703 | 9/1995 | Amini et al. | 395/290 |

Primary Examiner—Ken S. Kim
Attorney, Agent, or Firm—Dorsey & Whitney LLP

[57] ABSTRACT

An apparatus and method increases the speed of processing in an electronic data processing system in which a signal set on a first, higher speed bus is communicated to a second, lower speed bus to execute a data transfer operation between the first, higher speed bus and the second, lower speed bus. The apparatus has means for storing the signal set communicated to the second bus in a first operation and means for detecting whether the next signal set communicated to the second bus for a second operation is the same as in the first operation. A state machine is operatively connected to the first and second buses for receiving dock signals from the first bus. The state machine is responsive to the clock signals to transition from an idle state to at least one set-up state in which a data transfer setup operation occurs and to a further state in which a data transfer is executed. Acceleration means is connected to the state machine and the means for detecting whether the signal sets for the first and second operations are the same. The acceleration means permits bypassing at least one set-up state in the state machine when the next signal set communicated to the second bus for the second operation is the same as in the first operation.

24 Claims, 6 Drawing Sheets

X – DON'T CARE
$T_1$ – CMD SETUP
$T_2$ – ACCESS
$T_3$ – DATA HOLD

X – DON'T CARE
$T_4$ – CMD SETUP
$T_5$ – DATA SETUP
$T_6$ – DATA HOLD
$T_7$ – CMD HOLD

5,581,793

SYSTEM FOR BYPASSING SETUP STATES IN A BUS OPERATION

This is a continuation of application Ser. No. 08/111,209 filed Aug. 24, 1993, now abandoned.

TECHNICAL FIELD

This invention relates to data processing systems using synchronous and asynchronous buses to perform input-output (I/O) or memory access operations. More particularly, this invention relates to apparatus and methods for skipping unnecessary steps in a new I/O operation or memory access operation when a prior operation has satisfied these steps.

BACKGROUND ART

When the central processing unit (CPU) of a data processing system performs input-output (I/O) or memory access operations, the CPU will issue a sequence of signals specifying the location of information to be brought in to the CPU or information to be sent out by the CPU for storage. Such operations often involve placing address information on a synchronous bus to establish communication with a device or memory unit on an asynchronous bus that is the source or destination for the information transfer, issuing the command defining the operation to be performed and then passing the actual data to be transferred. The details of these steps, including the control lines that must be asserted, the timing for placing address or data signals on the buses that carry them and the timing for the control signals are specified by various bus protocols and/or by the requirements of the input-output (I/O) or memory device in question. In most protocols there are required time intervals for holding certain signals, including particularly set-up intervals.

The set-up intervals associated with commands for data transfers to the CPU define the time periods during which address lines must be held stable before the READ command signal is provided. For data transfers from the CPU, there is not only a period for address set-up but also another required time interval after issuance of the WRITE command during which the data signals must be held stable.

With each input-output (I/O) or memory access operation, the full sequence of steps specified by the protocol is normally executed. This sequence involves the above-discussed, required set-up times. The failure to provide the setup times can lead to writing to an incorrect address or loss of data. For example, if the asynchronous device is a static RAM, a WRITE to the wrong location could occur if the address for writing were not held stable through the cycle or if the set-up or hold times were violated relative to the WRITE signal pulse.

In many transfers of information to or from a CPU, a principle of locality operates. This means that one data transfer to or from a particular location or device is likely to be followed by a data transfer to or from the same or a similar location or device, having the same address. Thus, in following the same data transfer protocol even when the address is the same, the data transfer control circuitry will be repeating at least some of the same sets of signals and the same setup periods. This repetition slows communications to and from the CPU.

It would be desirable to have an apparatus or method that would reduce the time overhead of data transfers to or from the same addressed device on an asynchronous bus.

SUMMARY OF THE INVENTION

The present invention is an apparatus and method for increasing the speed of processing (memory or I/O) in an electronic data processing system in which a signal set on a first bus is communicated to a second bus to execute a data transfer operation between the first bus and the second bus. The apparatus has means for storing the signal set communicated to the second bus in a first operation and means for detecting whether the next signal set communicated to the second bus for a second operation is the same as in the first operation. A state machine is operatively connected to the first and second buses for receiving clock signals from the first bus. The state machine is responsive to the clock signals to transition from an idle state to at least one set-up state in which a data transfer set-up operation occurs and to a further state in which a data transfer is executed. Acceleration means is connected to the state machine and the means for detecting whether the signal sets for the first and second operations are the same. The acceleration means permits bypassing at least one set-up state in the state machine when the next signal set communicated to the second bus for the second operation is the same as in the first operation.

DETAILED DESCRIPTION OF THE PREFERRED EMBODIMENT

When a CPU communicates with various peripheral devices within a computer system, it is often necessary to transfer data to/from a first bus and a second bus. The first bus is usually a high speed synchronous bus and the second bus is usually a lower speed asynchronous bus, but the invention is applicable without regard to bus speed. Data transfers to or from asynchronous buses are characterized as involving a signal set comprising various command and data signals. (A signal set as referred to in this description may mean all the signals communicated at one point in time or only a subset of such signals, such as the signals specifying an address or the signals specifying data.) Most notable are command signals corresponding to a READ operation and a WRITE operation. Various communication protocols and bus types define the way the command signals and the actual bus data transfers occur. Most data buses, however, have a WRITE operation signaled by a WRITE command and a READ operation signaled by a READ command. With these two signals the direction of data flow is determined. An alternative structure employs a READ/WRITE signal and a COMMAND signal, with the direction of data flow determined by the READ/WRITE signal and the actual data transfer being controlled by the COMMAND signal. (This second signal structure is logically identical to the first.)

Figure 1:
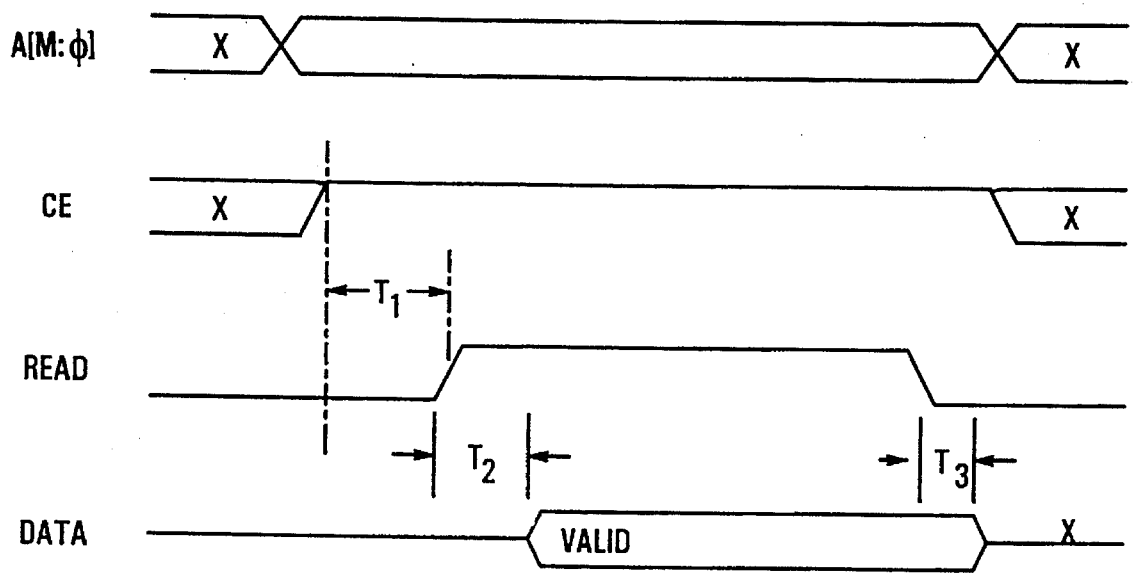
FIG. 1 is a timing diagram showing the relative timing and the setup and hold time intervals for the basic signals involved in an asynchronous bus READ operation in accordance with the prior art.

In either case the command signal(s) are qualified by other signals, most often including a chip enable (CE) signal and several address signals (A[0:M]). The address signals determine the exact destination or source of the data within the peripheral device or memory. Higher order address bits are generally decoded to allow communication with many peripheral devices attached to the asynchronous bus. Normally, those address lines determine whether a particular CE signal corresponding to a particular peripheral device is active or inactive. A timing diagram for a typical prior art asynchronous bus is shown in FIG. 1 (READ) and FIG. 2 (WRITE). As can be seen, both the READ and WRITE sequences start with an address signal, followed by a chip enable signal, then the particular command signal (READ or WRITE) and the data signals that are the object of that command.

Figure 3:
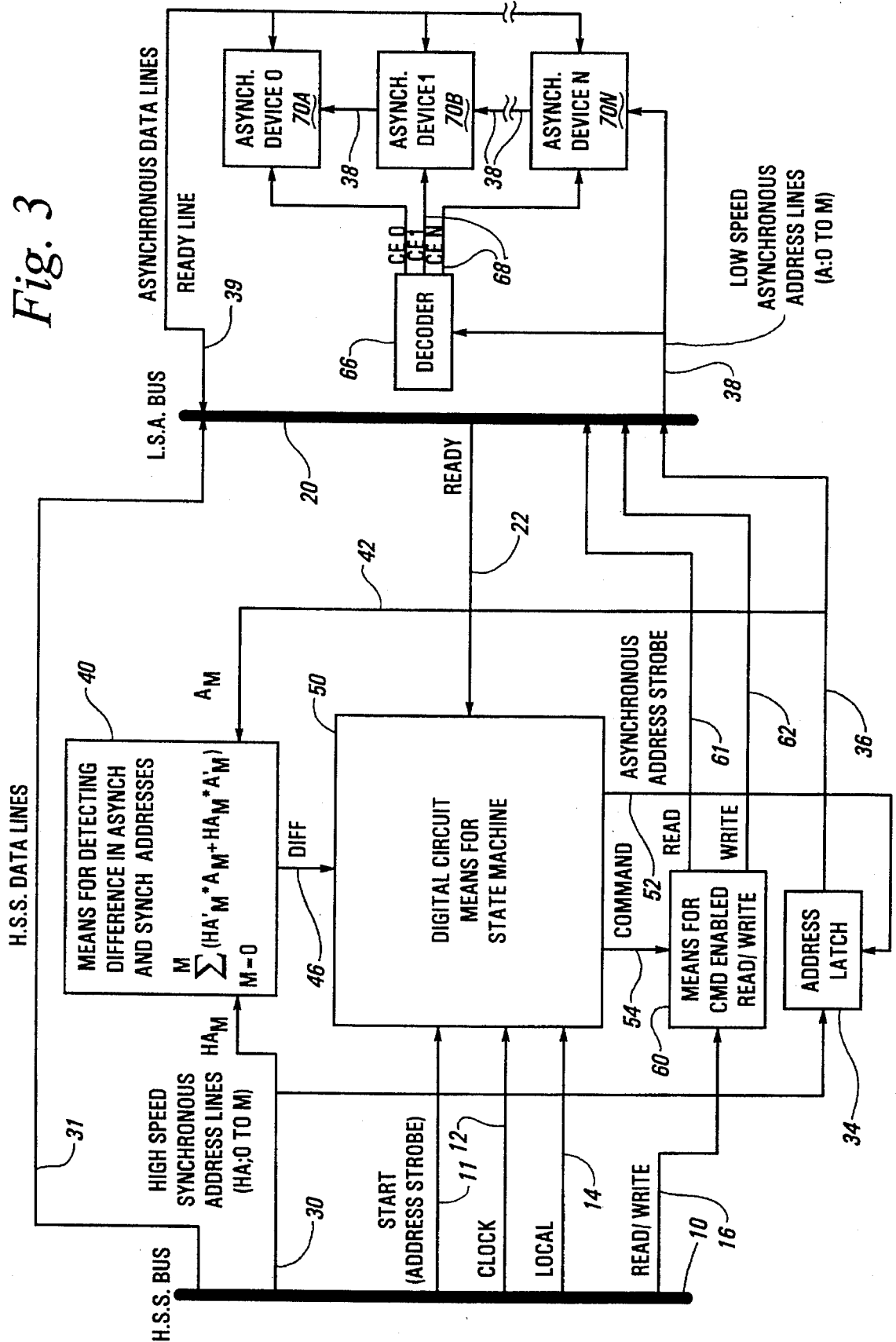
FIG. 3 is a block diagram showing how the present invention fits in the context of a synchronous and an asynchronous bus.

A significant factor in determining the rate at which data may be transferred across the asynchronous bus is the different set up and hold times required by the peripherals or memory devices on that bus. The present invention accelerates these asynchronous bus operations by shortening the cycle whenever the setup time has been satisfied by the previous cycle because a new asynchronous device address is equal to the previous address on the asynchronous bus. An operation is herein defined as a memory operation, an I/O operation, or both. FIG. 3 shows in schematic block diagram form how the present invention achieves that goal.

As seen in FIG. 3, the environment for the invention is a high speed synchronous (HSS) bus 10 that communicates commands to a low speed asynchronous (LSA) bus 20, to which a decoder 66 and peripheral storage or memory devices 70A, 70B, . . . 70N are attached. Signals issued by the HSS bus 10 in a bus cycle are: the set of signals HA[0:M] on address lines 30, identifying the target device and location; the START or address strobe signal on line 11, signalling the issuance of new address signals; the system CLOCK signal on line 12; the LOCAL signal on line 14, identifying the operation as intended for the HSS bus 10 rather than the LSA bus 20; the READ/WRITE signal on line 16; and the data signals on line 31.

To coordinate a high speed synchronous bus operation with a lower speed asynchronous bus operation, a state machine 50 attached to both buses 10, 20 is used. (For a general description of state machines as realized in programmable logic, see PAL® Device Handbook by Advanced Micro Devices, p. 2-101 to 2-107 (Copyright 1988)). The state machine 50 is clocked by the HSS bus 10 via CLOCK line 12. Outputs of the state machine 50 include the Asynchronous Address Strobe on line 52, leading to the address latch 34, and the Command line 54, leading to means 60 for a CMD (Command) enabled enabled READ (signaled on line 61) or WRITE (signaled on line 62). Both of the READ and WRITE output lines 61, 62 are connected to the LSA bus 20. The LSA bus 20 provides a READY signal on line 22 as an input to the state machine 50.

The LSA bus 30 receives not only the READ and WRITE signals on lines 61 and 62, respectively, but also the address signals latched into address latch 34 and passed on via bus 36, as well as the data signals on lines 31. From the LSA bus 20, the address signals on bus 36 flow via bus 38 to a decoder 66 and to each of the asynchronous devices 70A, 70B, . . . 70N The decoder 66 has chip enable output lines 68 (CE0, CE1, . . . CEN), one for each of the devices 70A, 70B, . . . 70N. The devices 70A, 70B, . . . 70N are two-way connected to LSA bus 20 by the bus lines 39, which carry data and the READY signals.

Figure 4:
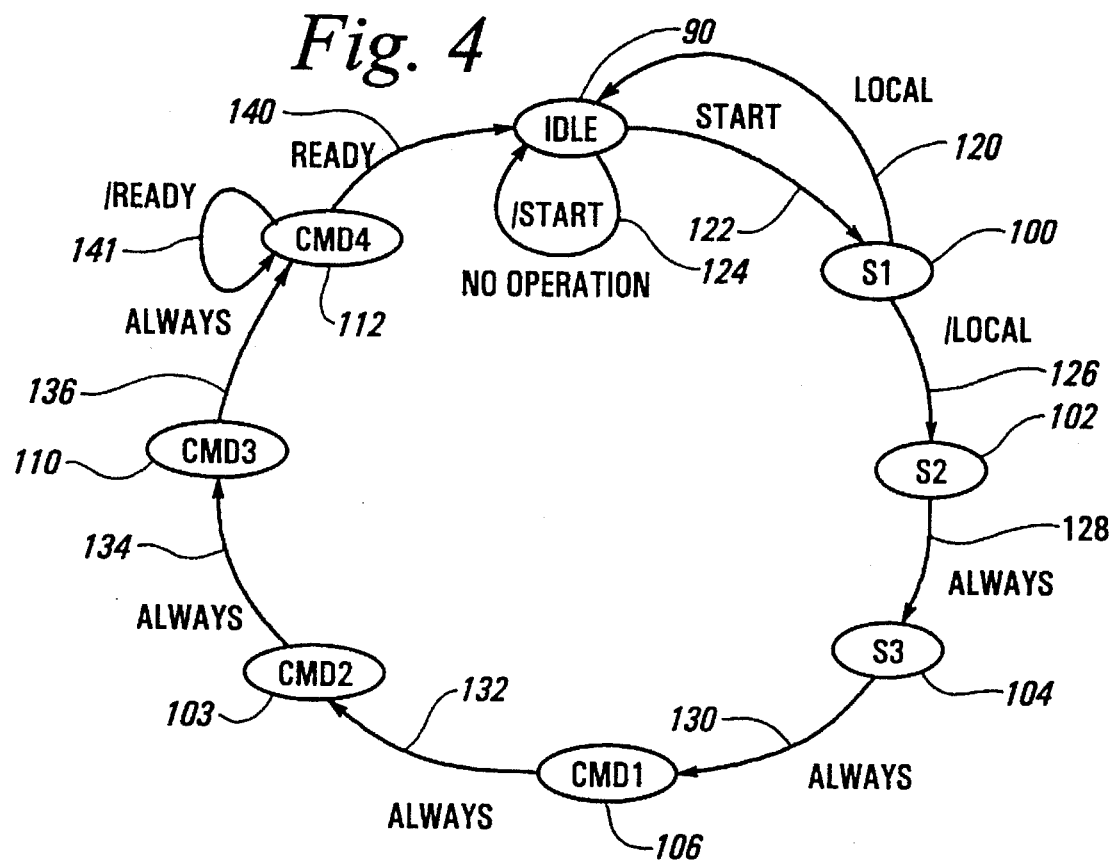
FIG. 4 is a state diagram for a state machine in accordance with the prior art that controls communications between a synchronous and an asynchronous bus.

A typical prior art state diagram for the state machine 50 is shown in FIG. 4. By convention, the nodes, IDLE, S1–S3 and CMD1–CMD4, indicate states. The arrows connecting one node to another (or circling back to the same node) indicate state transitions. Written beside the transition arrows is the signal or set of signals that causes the transition. (A "/" in front of a signal name indicates the logical opposite of the signal, e.g., START and /START are logical opposites.)

During the IDLE state 90 the state machine 50 waits for the start of a new bus cycle. When a START signal occurs, the state machine 50 follows transition path 120 to the S1 state 100. If no START signal is present, each clock pulse simply causes the state machine 50 to cycle in the IDLE state using transition path 124. In the S1 state, the state machine logic determines, based on the signal on the LOCAL line 14, whether the bus cycle will be completed by the HSS bus 10 or passed to the LSA bus 20. If the HSS bus 10 is to handle the bus cycle, the LOCAL signal causes transition path 120 to be taken back to IDLE state 90; otherwise, transition paths 126 and 128 are taken to begin the bus setup time, which is continued through states S2 102 and S3 104. At S2 102, the HSS bus address is passed to the LSA bus 20 by the state machine 50 asserting the Asynchronous Address Strobe on line 52. This permits the decoder 66 to select one of the chip enable lines 68 (CE0, CE1, . . . CEN). The time in states S2 102 and S3 104 must be greater than the period labeled T1 in FIG. 1 or T4 in FIG. 2. (The depiction of states S2 and S3 is a simplified example. To achieve a longer time period, there could be any number of such setup states.)

During this time, the addressed device 70A, 70B, . . . or 70N on the LSA bus 20 has its command setup requirements met, and starting in state CMD1 106 the READ or WRITE command signals are driven onto the LSA bus 20. During states CMD1–CMD4 106, 108, 110, 112, the command signals and data signals are driven for the time prescribed by the bus protocol. In many systems the addressed device 70A, 70B, . . . or 70N may extend the command time by de-asserting a READY signal. This causes cycling in the CMD4 state 112 using transition path 141.

Figure 5:
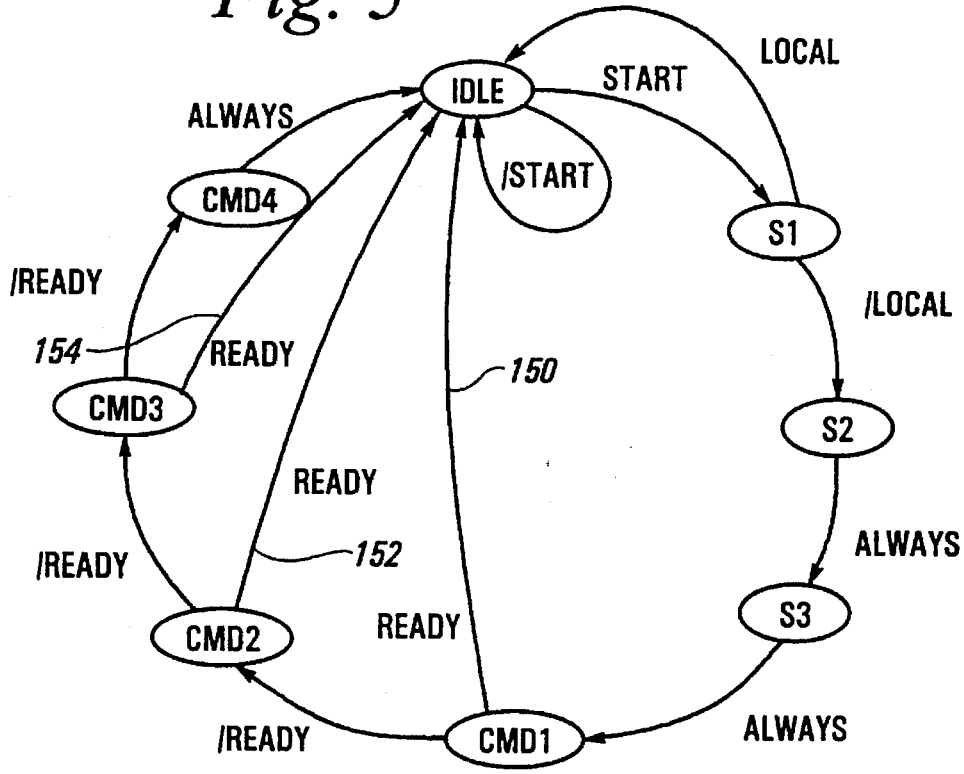
FIG. 5 is a state diagram for a state machine in accordance with the prior art as in FIG. 4, but with the additional feature of transitions that allow command states to be skipped when the asynchronous device can signal its readiness.

In the embodiment of FIG. 4, the state machine 50 must pass through each of the states CMD1 to CMD4 (106, 108, 110, 112) before it is possible to complete the bus cycle and return to the IDLE state 90. Alternatively, in some state machines the command time may be shortened by asserting a READY signal. If the READY signal can be asserted in any one of the states CMD1, CMD2 or CMD3, there must be new transition paths 150, 152, 154, respectively, leading from each of these states to the IDLE state 90. This is shown in the prior art state diagram of FIG. 5.

With either of the prior art state machine designs (FIGS. 4 and 5), at the completion of the command the state machine 50 is returned to the IDLE state, at which time a new bus cycle may be started. Note that the address (and thus chip enable) signals on the LSA bus 20 do not change until state S2 102. The present invention takes advantage of this timing.

The present invention recognizes that if, in a new data transfer operation, the HSS bus 10 places the same address HA[0:M] on the lines 30 as in the last addressing cycle for the LSA bus 20, it will not be necessary to re-establish that address on the LSA bus 20 for the new bus cycle. The address will have been latched into an address latch 34 with the prior /LOCAL signal (leading to the Asynchronous Address Strobe on line 52) and passed to the LSA bus 20. The high order bits will have been decoded by decoder 66 to lead to the chip enable signal on lines 68 and these signals need not again be held for the set-up period. To take advantage of this situation, the present invention contemplates changes in the state diagram for the state machine 50 as compared to the prior art diagrams of FIGS. 4 and 5. These changes then permit different state machine behavior when the old and new addresses for the LSA bus are the same.

Figure 6:
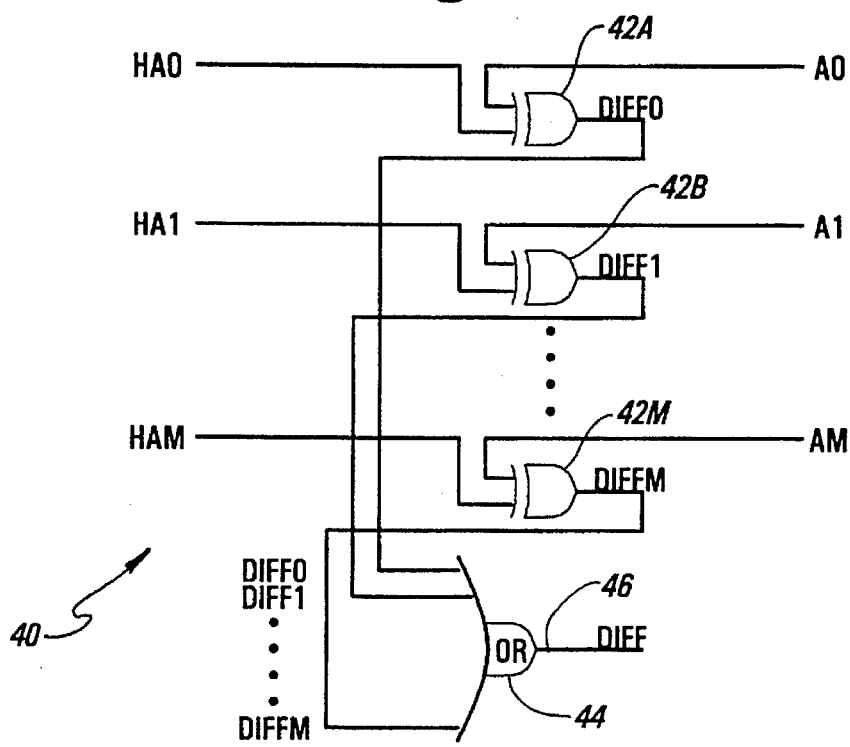
FIG. 6 is a logic schematic for the bus delta detector used in the present invention.

The determination of whether the HSS bus 10 is issuing the same address is made by a delta detection means 40. As seen in FIG. 3, the delta detector (change detector) receives the previously latched address via lines 36 and 42 and continuously compares the HSS bus addresses to the LSA bus address. FIG. 6 shows the logic structure of the delta detector 40, consisting of a parallel array of XOR gates 42a, 42b ... 42m, receiving as inputs that portion of the HSS bus signal that is on lines HA0, HA1, ... HAM. The outputs of these XOR gates are provided as inputs to an OR gate 44 and determine a DIFF signal on line 46. The state of the DIFF signal on line 46 communicates to the state machine 50 as implemented in the present invention the information that allows it to select a more efficient transition path.

In some cases, particularly when the requirements for a device attached to the bus are known, it may be required that only a subset of the address bits remain constant. For example, address bits that specify a particular byte can be ignored if the set-up time is independent of the particular byte addressed. Similarly, address bits that specify a particular location within a device may be ignored when address aliasing is used to identify the particular location within a device.

During state S1 100 the results of the delta detector 40 may be used to effect a shortening of the asynchronous bus cycle. If during state S1 100 the DIFF signal is active on line 46, then the address on the HSS bus 10 is different than that last presented on the LSA bus 20. In this case the state machine 50 must proceed as in the prior art, passing through states S2 102 and S3 104 (more generally, the state machine 50 must pass through all the setup states) in order to satisfy the setup time requirements of the device(s) on the LSA bus 20.

Figure 7:
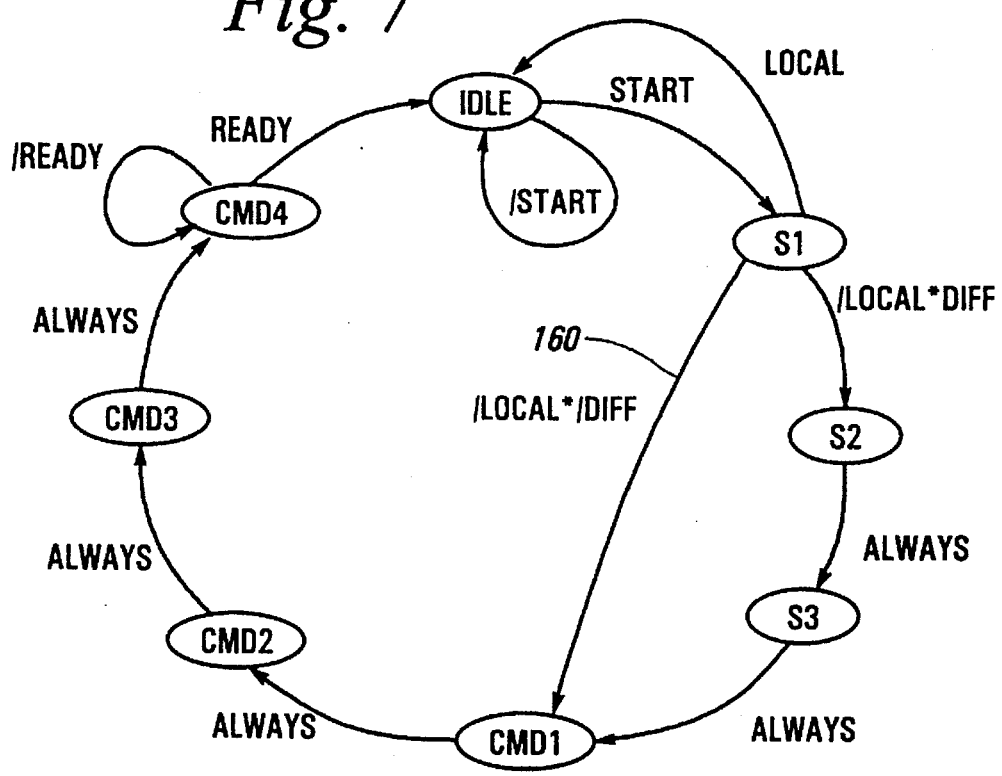
FIG. 7 is a state diagram for a state machine in accordance with the present invention that controls communications between a synchronous and an asynchronous bus and allows shortcut transitions when no address delta is detected.
Figure 8:
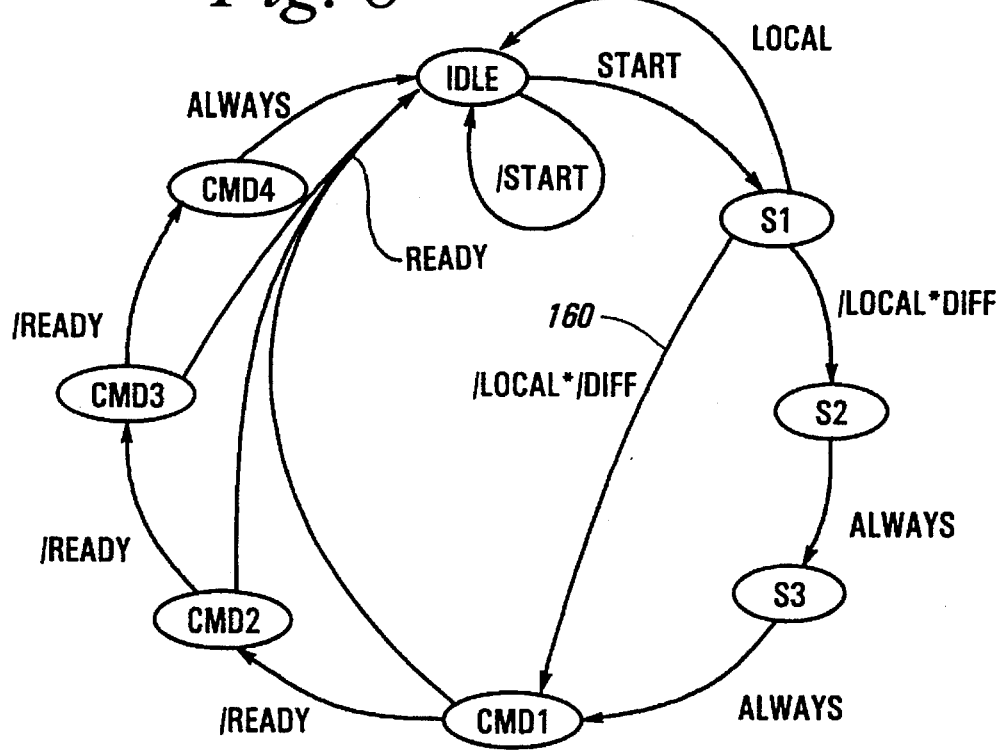
FIG. 8 is a state diagram for a state machine in accordance with the present invention that controls communications between a synchronous and an asynchronous bus and allows shortcut transitions when no address delta is detected, but with the additional feature of transitions that allow command states to be skipped when the asynchronous device can signal its readiness.

If, however, during state S1 100 the results of the delta-detector 40 show the addresses to be the same (DIFF line 46 inactive) then states S2 102 and S3 104 may be skipped (more generally, the state machine 50 may skip the remaining setup states); the setup time has been satisfied by the previous bus cycle. The new state diagrams for a state machine implementing the present invention are illustrated in FIG. 7 and FIG. 8, showing the new transition path 160 added to FIGS. 4 and 5, respectively.

Figure 2:
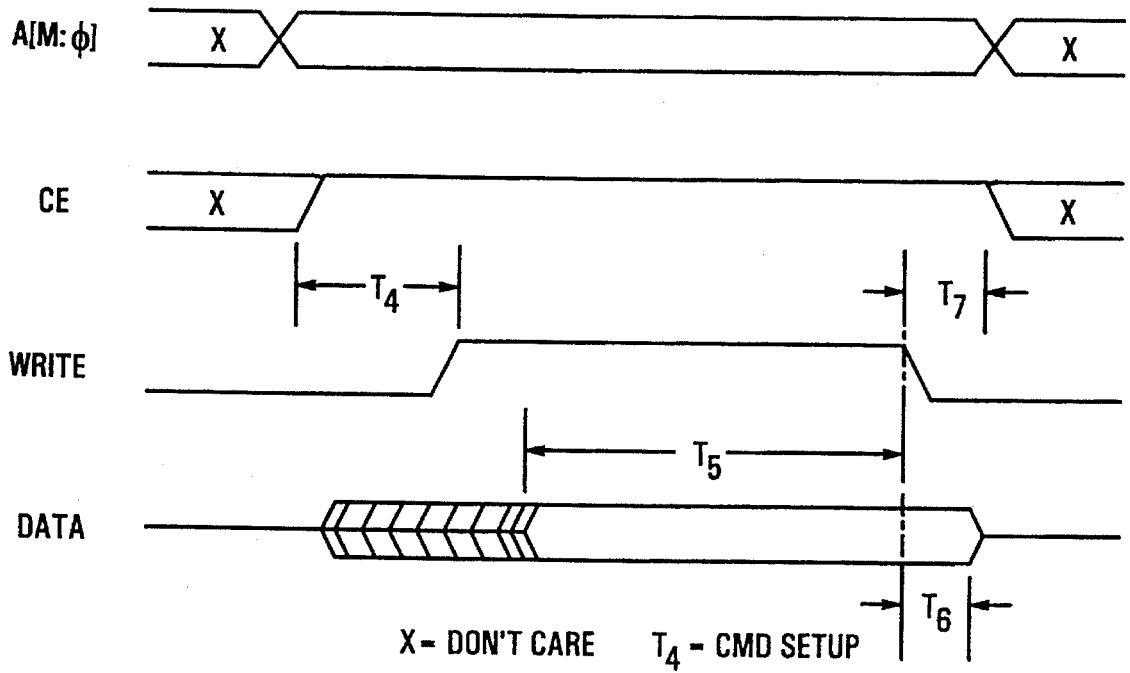
FIG. 2 is a timing diagram showing the relative timing and the setup and hold time intervals for the basic signals involved in an asynchronous bus WRITE operation in accordance with the prior art.
Figure 9:
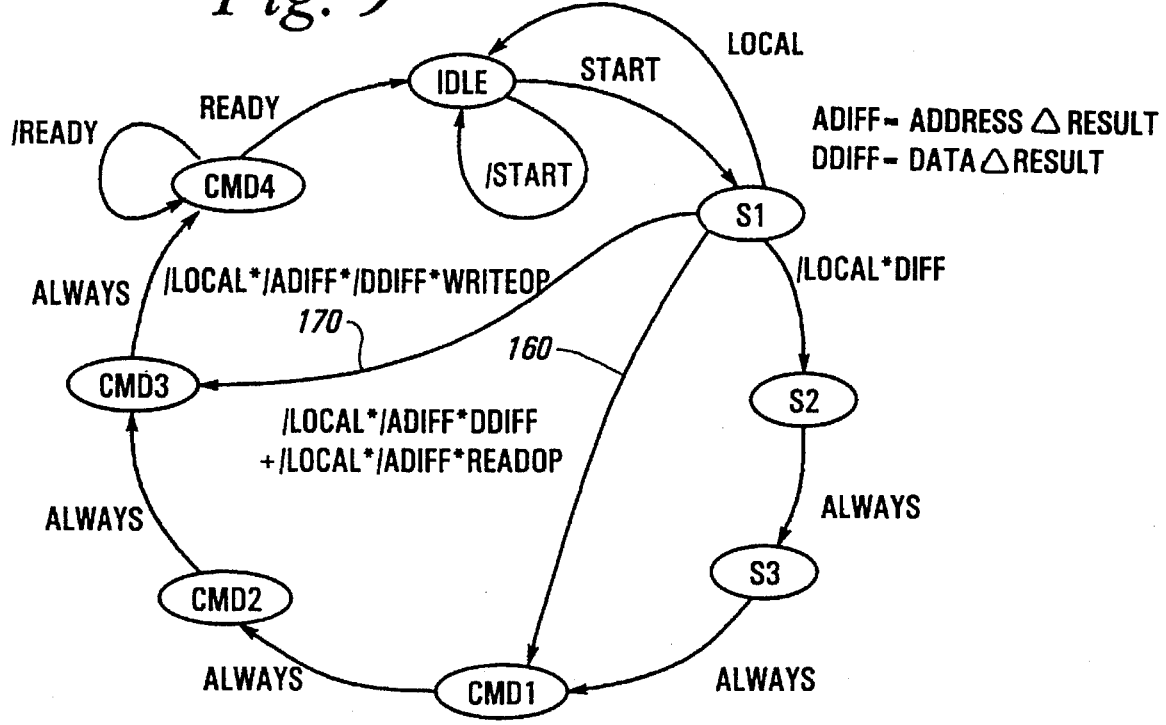
FIG. 9 is a state diagram for a state machine in accordance with the present invention that controls communications between a synchronous and an asynchronous bus and allows shortcut transitions when an address delta is not detected or an address delta and a data delta are not detected.
Figure 10:
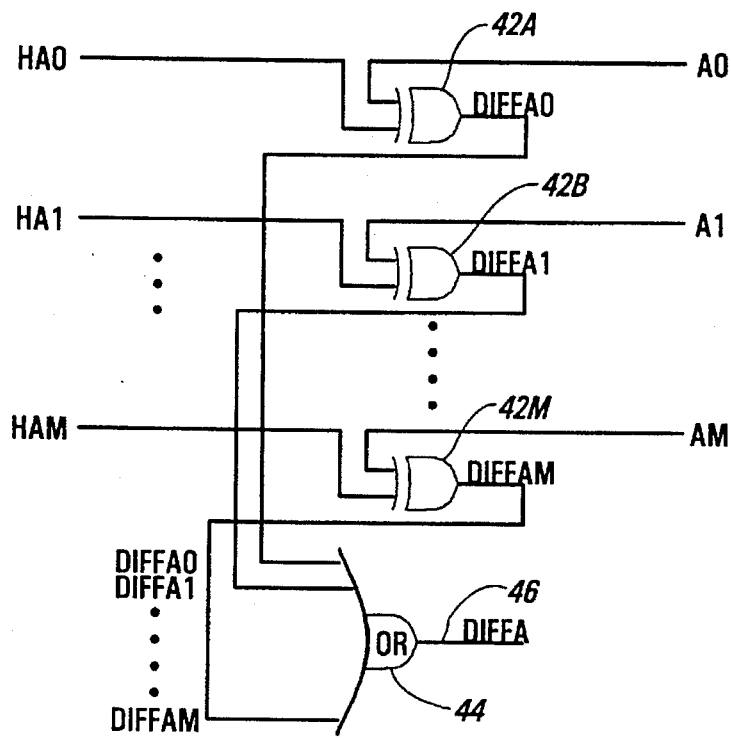
FIG. 10 is a logic schematic for the bus delta detector of FIG. 6, extended to cover delta detection in data lines.
Figure 10:
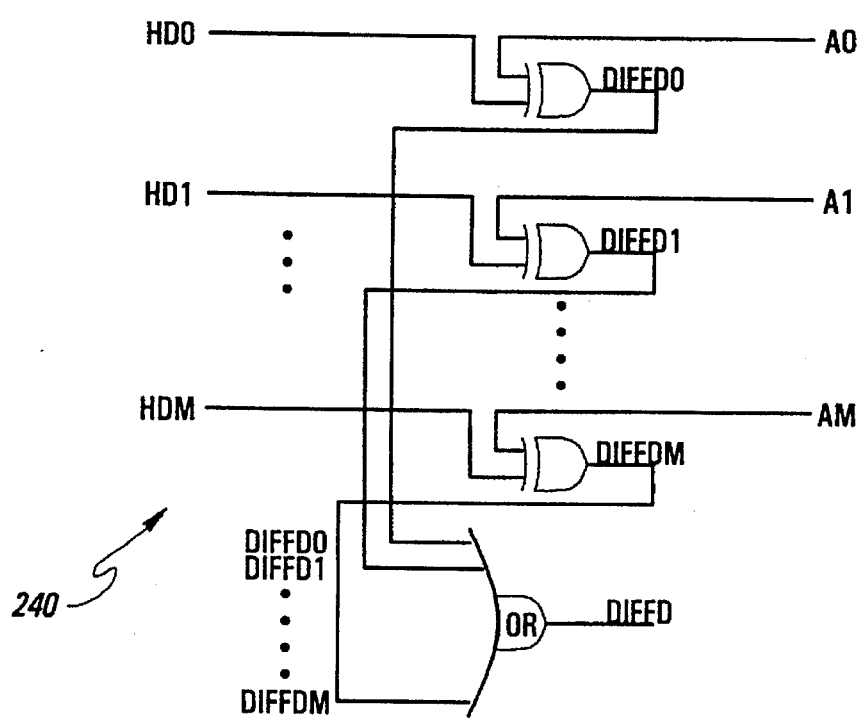

This delta detect approach may also be applied to further shorten asynchronous bus data transfer operations by applying the delta detector 40 to the that portion of the HSS bus signal set that is on data lines 31. In this case the target is the shortening of the DATA setup time as shown in FIG. 2 at T5. A state machine employing this design is illustrated in FIG. 9. A delta detector 240 extended to provide difference signals for both the address lines (DIFFA) and the data lines (DIFFD) is shown in FIG. 10. To implement this, it would be necessary to change the logic structure shown in FIG. 3 so that the signals on data lines 31 become inputs to the delta detector 40 and are latched into a data latch (not shown) in the same manner as the address signals on lines 30 are latched into the address latch 34.

In general, delta detect may be applied whenever a setup time is required on any signal. The present invention may also be implemented internal to logic device for use when communicating with other internal circuit elements. The state machine diagrams shown are only examples, for an idealized, simple bus control structure. State machines with state diagrams embodying the present invention can be implemented by application specific integrated circuits or by use of the programmable logic devices described in the PAL® Device Handbook by Advanced Micro Devices (identified above) or by discrete digital logic configurations.

While the preferred embodiments of the invention have been illustrated and described, it is to be understood that the invention is not limited to the precise method and apparatus herein disclosed, and the right is reserved to all variations coming within the scope of the appended claims.

I claim:

1. A computer with facilities for executing data transfer operations between the computer and a peripheral device, comprising:

a processing unit for generating a sequence of signal sets;

a system bus for receiving the sequence of signal sets from the processing unit;

a device bus, capable of being operably connected to the peripheral device;

means for communicating a first signal set from the system bus to the device bus in a first data transfer operation, and for communicating a second signal set from the system bus to the device bus in a second data transfer operation, wherein the second signal set consecutively follows the first signal set on the device bus;

means for storing the first signal set;

means for detecting whether the second signal set is the same as the first signal set;

state machine means operatively connected to the system bus for receiving clock signals from the system bus, said state machine means being responsive to the clock signals to transition from at least one set-up state in which a data transfer setup operation occurs to a further state in which a data transfer is executed; and acceleration means, connected to the state machine means and the means for detecting, for bypassing the at least one set-up state in the state machine means when the second signal set is the same as the first signal set.

2. The computer of claim 1 wherein the first and second operations are read operations.

3. The computer of claim 1 wherein the first and second operations are write operations.

4. The computer of claim 2 wherein the information in the signal sets is address information.

5. The computer of claim 3 wherein the information in the signal sets is data information.

6. The computer of claim 1 wherein the at least one set-up state in which a data transfer set-up operation occurs involves a set-up delay between the assertion of an address signal and the assertion of a command for execution of the data transfer.

7. The computer of claim 2 wherein more than one set-up state is bypassed.

8. The computer of claim 3 wherein more than one set-up state is bypassed.

9. The computer of claim 1 wherein the system bus is synchronous and the device bus is asynchronous.

10. The computer of claim 1 wherein the system bus is a higher speed bus than the device bus.

11. The computer of claim 1 wherein the system bus is a lower speed bus than the device bus.

12. A computer with facilities for executing data transfer operations between the computer and a peripheral device, comprising:

a processing unit for generating a sequence of addresses;

a system bus for receiving the sequence of addresses from the processing unit;

a device bus, capable of being operably connected to the peripheral device;

means for communicating a first address from the system bus to the device bus in a first data transfer operation, and for communicating a second address from the system bus to the device bus in a second data transfer operation, wherein the second address consecutively follows the first address on the device bus;

means for storing the first address;

means for detecting whether the second address is the same as the first address;

state machine means operatively connected to the system bus for receiving clock signals from the system bus, said state machine means being responsive to the clock signals to transition from at least one set-up state in which a data transfer setup operation occurs to a further state in which a data transfer is executed; and a first acceleration means, connected to the state machine means and the means for detecting, for bypassing the at least one set-up state in the state machine means when the second address is the same as the first address.

13. The computer of claim 12 wherein the state machine means has at least one data set transfer set-up state and the computer further comprises:

means for communicating a first data set from the system bus to the device bus in the first data transfer operation, and for communicating a second data set from the system bus to the device bus in the second data transfer operation, wherein the second data set consecutively follows the first data set on the device bus;

means for storing the first data set;

means for detecting whether the second data set is the same as the first data set; and a second acceleration means, connected to the state machine means and the means for detecting, for bypassing the data set transfer set-up state in the state machine means when the second data set is the same as the first data set.

14. A method for increasing the speed of data transfers in a computer between a peripheral device on a device bus and a processing unit on a system bus, wherein the peripheral device has a setup time, said method comprising the steps of:

placing a first signal set for a first data transfer operation on the system bus;

communicating the first signal set to the device bus;

satisfying the setup time by waiting for a period of time equal to or greater than the setup time, and then transferring information between the device bus and the device;

storing the first signal set;

placing a second signal set on the system bus, and communicating it to the device bus, wherein the second signal set consecutively follows the first signal set on the device bus;

comparing the second signal set to the first signal set; and transferring information between the device bus and the device without waiting to satisfy the setup time if the second signal set is the same as the first signal set.

15. A method as recited in claim 14 wherein the first and second operations are read operations.

16. A method as recited in claim 14 wherein the first and second operations are write operations.

17. A method as recited in claim 15 wherein the information in the first signal set and in the second signal set is address information.

18. A method as recited in claim 16 wherein the information in the first signal set and in the second signal set is data information.

19. A method as recited in claim 15 wherein more than one set up state is bypassed.

20. A method as recited in claim 16 wherein more than one set up state is bypassed.

21. A method as recited in claim 14 wherein the system bus is synchronous and the device bus is asynchronous.

22. A method as recited in claim 14 wherein the system bus is a higher speed bus than the device bus.

23. A method as recited in claim 14 wherein the system bus is a lower speed bus than the device bus.

24. A bus interface between a system bus and a device bus for increasing the speed of a device bus data transfer operation, wherein the device bus operation involves transferring an address from the system bus to the device bus, and wherein the bus interface comprises:

address delta detection means for determining whether a first transferred address is the same as a second transferred address, wherein the second address is the next consecutive address transferred from the system bus to the device bus after the first address is transferred from the system bus to the device bus; and a state machine for controlling device set-up states in data transfer operations, wherein the state machine is responsive to the address delta detection means so that at least one device set-up state is bypassed when the second address is the same as the first address.

* * * * *

UNITED STATES PATENT AND TRADEMARK OFFICE
CERTIFICATE OF CORRECTION

PATENT NO. : 5,581,793
DATED : December 3, 1996
INVENTOR(S) : Dean A. Klein

It is certified that error appears in the above-indentified patent and that said Letters Patent is hereby corrected as shown below:

Title page, item [57],
In line 11 of the Abstract, "dock" should be --clock--.

Signed and Sealed this

First Day of July, 1997

Attest:

BRUCE LEHMAN

*Attesting Officer*          *Commissioner of Patents and Trademarks*